United States Patent
Du et al.

(10) Patent No.: US 12,487,595 B2
(45) Date of Patent: Dec. 2, 2025

(54) DATA PROCESSING METHOD, CONTROL APPARATUS AND STORAGE MEDIUM

(71) Applicant: SZ DJI TECHNOLOGY CO., LTD., Shenzhen (CN)

(72) Inventors: Jiexi Du, Shenzhen (CN); Jifei Xu, Shenzhen (CN); Chen Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 345 days.

(21) Appl. No.: 18/133,395

(22) Filed: Apr. 11, 2023

(65) Prior Publication Data

US 2023/0244227 A1    Aug. 3, 2023

Related U.S. Application Data

(63) Continuation of application No. PCT/CN2020/120498, filed on Oct. 12, 2020.

(51) Int. Cl.
*G05D 1/00* (2006.01)
*G06T 7/73* (2017.01)
(Continued)

(52) U.S. Cl.
CPC ......... *G05D 1/0038* (2013.01); *G05D 1/0094* (2013.01); *G06T 7/73* (2017.01);
(Continued)

(58) Field of Classification Search
CPC ...... G05D 1/0038; G05D 1/0094; G06T 7/73; G06T 7/90; G06T 17/00; G06T 19/20;
(Continued)

(56) References Cited

U.S. PATENT DOCUMENTS 10,552,560 B2 *   2/2020   Brooks ............... G06F 9/45537
12,299,944 B2 *   5/2025   Sugio ..................... G06T 9/001
(Continued)

FOREIGN PATENT DOCUMENTS

CN    109154499 A    1/2019
CN    109767452 A    5/2019
(Continued)

OTHER PUBLICATIONS

International Search Report of PCT/CN2020/120498 (Jul. 8, 2021).

*Primary Examiner* — Peter D Nolan
*Assistant Examiner* — Wae L Louie

(57) ABSTRACT

A data processing method, a control apparatus and a storage medium are provided. The method includes: obtain three-dimensional data of a sampling point, the three-dimensional data of the sampling point is collected by a point cloud sensor carried by a movable platform during a movement of the movable platform; obtain first position and attitude data of the movable platform and/or the point cloud sensor when the sampling point is collected; project the sampling point onto an observation plane according to the three-dimensional data of the sampling point and the first position and attitude data; and generate a point cloud picture according to the sampling point projected onto the observation plane, the point cloud picture is configured to be displayed on a user apparatus of the movable platform.

20 Claims, 6 Drawing Sheets

(51) Int. Cl.
*G06T 7/90* (2017.01)
*G06T 17/00* (2006.01)
*G06T 19/20* (2011.01)

(52) U.S. Cl.
CPC ............... *G06T 7/90* (2017.01); *G06T 17/00* (2013.01); *G06T 19/20* (2013.01); *G06T 2200/04* (2013.01); *G06T 2207/10028* (2013.01); *G06T 2219/2012* (2013.01)

(58) Field of Classification Search
CPC ....... G06T 2200/04; G06T 2207/10028; G06T 2219/2012
See application file for complete search history.

(56) References Cited

U.S. PATENT DOCUMENTS

| | | | |
|---|---|---|---|
| 2003/0135327 A1* | 7/2003 | Levine | G01S 19/49 342/357.65 |
| 2018/0144547 A1 | 5/2018 | Shakib et al. | |
| 2019/0346271 A1* | 11/2019 | Zhang | G05D 1/245 |
| 2019/0355121 A1 | 11/2019 | Nelson et al. | |
| 2021/0404840 A1* | 12/2021 | Menon | G01C 21/3893 |
| 2022/0113421 A1* | 4/2022 | Xu | G01S 7/4808 |
| 2022/0309767 A1* | 9/2022 | Keefe | G06V 10/764 |
| 2023/0017612 A1* | 1/2023 | Iguchi | G06T 9/001 |
| 2023/0244227 A1* | 8/2023 | Du | G06T 7/73 |
| 2024/0221186 A1* | 7/2024 | John Wilson | G06T 7/251 |

FOREIGN PATENT DOCUMENTS

| | | |
|---|---|---|
| CN | 110111414 A | 8/2019 |
| CN | 110869974 A | 3/2020 |
| CN | 110998671 A | 4/2020 |
| CN | 111316289 A | 6/2020 |
| CN | 111598034 A | 8/2020 |
| EP | 3299763 A1 | 3/2018 |

* cited by examiner

DATA PROCESSING METHOD, CONTROL APPARATUS AND STORAGE MEDIUM

RELATED APPLICATIONS

This application is a continuation of PCT Application Serial No. PCT/CN2020/120498, filed on Oct. 12, 2020, designating the United States and published in English, which is hereby incorporated by reference.

TECHNICAL FIELD

The present disclosure relates to the field of data processing technologies, and particularly to a data processing method, a control apparatus and a storage medium.

BACKGROUND

With the development of the unmanned aerial vehicle technology and lidar, the collection of point cloud data by an airborne lidar becomes an important basic means for map acquisition and object measurement in various fields.

For most of existing airborne lidar systems, data is collected and then processed by a high-performance computer to generate three-dimensional point cloud data and models, and target marking, identification and measurement may be performed on this basis. In the above data processing method, target marking, identification and measurement may be performed on the basis that a user drags a model on a display, such that a change of current collection when a position and an attitude of an unmanned aerial vehicle or a lidar change is difficult to reflect in real time, and a collection process is difficult to monitor in real time.

BRIEF SUMMARY

Based on this, the present disclosure provides a data processing method, a control apparatus and a storage medium.

In a first aspect, the present disclosure provides a data processing method, including: obtaining three-dimensional data of at least one sampling point collected by a point cloud sensor carried by a movable platform during a movement of the movable platform; obtaining first position and attitude data of at least one of the movable platform, or the point cloud sensor during the collecting of the at least one sampling point; projecting the at least one sampling point onto an observation plane according to the three-dimensional data of the at least one sampling point and the first position and attitude data; and generating a point cloud picture to be displayed on a user apparatus of the movable platform according to the at least one sampling point projected onto the observation plane.

Some exemplary embodiments of the present disclosure provide a data processing method, a control apparatus and a storage medium; when three-dimensional data of a point cloud is projected, a projection plane is the observation plane in a first person view (FPV) of the movable platform and/or the point cloud sensor; that is, the sampling point(s) may be projected on the observation plane according to the three-dimensional data of the sampling point(s) and the position and attitude data of the movable platform and/or the point cloud sensor, thus reflecting a change of the current collection in real time when a position and an attitude of the movable platform or the point cloud sensor change, and monitoring a collection process in real time; on the basis of projecting the sampling point(s) on the observation plane, a collection effect of the point cloud may be better shown, and interactive experience of the movable platform and user observation may be improved. On the basis of projecting the sampling point on the observation plane according to the three-dimensional data of the sampling point(s) and the position and attitude data of the movable platform and/or the point cloud sensor, the data processing method according to some exemplary embodiments of the present disclosure may be explained from the following three different main perspectives.

The first main perspective: a currently collected point cloud may be displayed according to a real-time change in the attitude of the movable platform and/or the point cloud sensor; every time a point cloud is collected, the projection plane may be recalculated, and a projected picture is generated. The three-dimensional data of the sampling point(s) may be collected by the carried point cloud sensor during movement of the movable platform, the sampling point(s) may be projected on the observation plane according to the three-dimensional data of the sampling point(s) and the position and attitude data of the movable platform and/or the point cloud sensor during the collection of the sampling point(s), and the point cloud picture may be generated according to the sampling point(s) projected on the observation plane, such that when the point cloud picture is displayed on the user apparatus of the movable platform, a user may observe real-time reflection of the condition of the corresponding sampling point(s) with the position and the attitude when the point cloud sensor on the movable platform collects the sampling point(s); when the position and the attitude of the movable platform and/or the point cloud sensor change in real time, the projection plane may be re-determined and the projected picture may be generated every time the point cloud is collected, such that when the projected picture is displayed on the user apparatus of the movable platform, the user may observe that the currently-collected point cloud as displayed when the position and the attitude of the movable platform and/or the point cloud sensor change in real time.

The second main perspective: formation of the FPV may be adjusted according to the position and attitude change of the movable platform and/or the point cloud sensor. In short, when the movable platform moves and/or the position and the attitude of the point cloud sensor change, a point cloud view of the FPV currently displayed on a user interface may also change with the position and attitude change of the movable platform and/or the point cloud sensor. The three-dimensional data of the sampling point(s) is the three-dimensional data of the sampling point(s) of the three-dimensional model in a target scene, the position and attitude data is the position and attitude data of the movable platform and/or the point cloud sensor carried by the movable platform relative to the target scene, the sampling point(s) is projected on the observation plane according to the three-dimensional data and the position and attitude data, the sampling point(s) projected on the observation plane may be collected by the movable platform and/or the point cloud sensor in a certain view, and the generated point cloud picture is also the point cloud picture of the sampling point(s) collected by the movable platform and/or the point cloud sensor in a certain view, such that when the movable platform moves and/or the position and the attitude of the point cloud sensor change, with the position and attitude change of the movable platform and/or the point cloud sensor, the point cloud view in the FPV currently displayed on the user interface also changes.

The third main perspective: the collection process of the point cloud sensor of the movable platform may be monitored in real time, the position and the attitude of the movable platform and/or the point cloud sensor may be monitored in real time, and the user may view the real-time collection process on the user interface. The point cloud sensor of the movable platform may be controlled to collect the measurement data of the sampling point(s) in the target scene, the three-dimensional data of the sampling point(s) in a geographic coordinate system may be determined according to the measurement data and the position and attitude data of the movable platform and/or the point cloud sensor in the geographic coordinate system during the collection of the sampling point(s), and the three-dimensional data of the sampling point(s) may be projected on the observation plane corresponding to the position and attitude data to generate the point cloud picture displayed on a user terminal of the movable platform, such that the user may view the real-time collection process of the point cloud sensor of the movable platform on the user interface.

It is understood that both the foregoing general description and the following detailed description are exemplary and explanatory only, and do not limit the present disclosure.

BRIEF DESCRIPTION OF THE DRAWINGS

To describe the technical solutions in some exemplary embodiments of the present disclosure, the following briefly describes the accompanying drawings. Apparently, the accompanying drawings in the following description show some exemplary embodiments of the present disclosure, and a person of ordinary skill in the art may still derive other drawings from these accompanying drawings without creative efforts.

DETAILED DESCRIPTION

Figure 1:
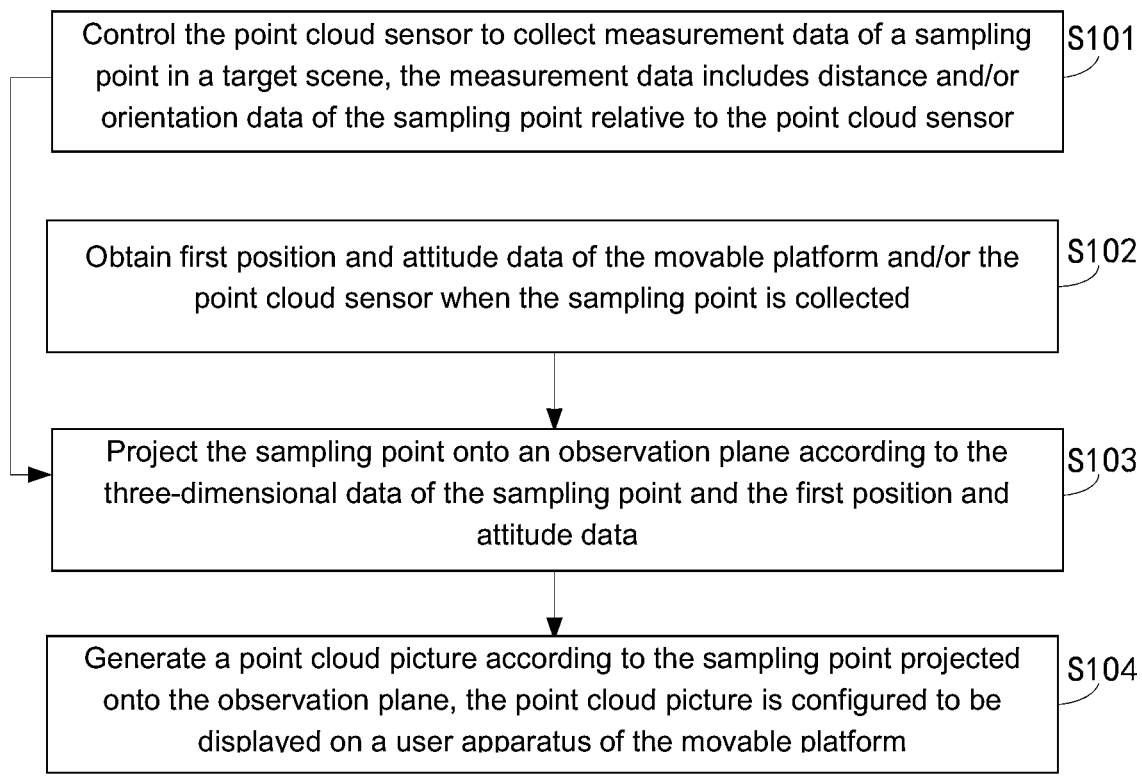
FIG. 1 is a schematic flow diagram of a data processing method according to some exemplary embodiments of the present disclosure.

The following describes the technical solutions of some exemplary embodiments of the present disclosure with reference to the accompanying. Apparently, the described embodiments are merely some but not all of the embodiments of the present disclosure. All other embodiments obtained by a person of ordinary skill in the art based on these exemplary embodiments of the present disclosure without creative efforts shall fall within the scope of protection of the present disclosure.

The flow diagrams shown in the drawings are for illustration only, and do not necessarily include all contents and operations/steps, nor do they have to be performed in the order as described herein. For example, some operations/steps may also be divided, combined or partially combined, such that the actual execution order may be changed according to the actual situation.

In most of existing airborne lidar systems, data is collected and then processed by a high-performance computer to generate three-dimensional point cloud data and models, and then target marking, identification and measurement are performed on this basis. In the above data processing method, target marking, identification and measurement are performed on the basis that a user drags a model on a display, such that a change of current collection in real time when a position and a attitude of an unmanned aerial vehicle or a lidar change is difficult to reflect, and a collection process is difficult to monitor in real time.

That is, in the existing technologies, a plane to which the three-dimensional data of the point cloud is projected is determined according to the dragging operation on the model by the user on the display, instead of the view of the unmanned aerial vehicle and/or the lidar, and therefore, the projection of the three-dimensional data of the point cloud on the plane in the existing technologies is not from a "first person view" (FPV) of the unmanned aerial vehicle.

Some exemplary embodiments of the present disclosure provide a data processing method, a control apparatus and a storage medium; when three-dimensional data of a point cloud is projected, a projection plane is an observation plane in an FPV of a movable platform and/or a point cloud sensor; that is, a sampling point is projected on the observation plane according to three-dimensional data of the sampling point and position and attitude data of the movable platform and/or the point cloud sensor, thus reflecting a change of the current collection when a position and an attitude of the movable platform or the point cloud sensor changes in real time, and monitoring a collection process in real time; on the basis of projecting the sampling point on the observation plane, a collection effect of the point cloud may be better shown, and interactive experience of the movable platform and user observation may be improved. On the basis of projecting the sampling point on the observation plane according to the three-dimensional data of the sampling point and the position and attitude data of the movable platform and/or the point cloud sensor, the data processing method according to some exemplary embodiments of the present disclosure will be explained below from three different main perspectives.

The first main perspective: a currently collected point cloud may be displayed according to a real-time change in the attitude of the movable platform and/or the point cloud sensor; every time a point cloud is collected, the projection plane is recalculated, and a projected picture may be generated. That is, the three-dimensional data of the sampling point may be acquired, and the three-dimensional data of the sampling point may be collected by the point cloud sensor carried by the movable platform in a movement process of the movable platform; the position and attitude data of the movable platform and/or the point cloud sensor may be acquired during collection of the sampling point; the sampling point may be projected onto the observation plane according to the three-dimensional data of the sampling point and the position and attitude data; and the point cloud picture is generated according to the sampling point projected onto the observation plane, and the point cloud picture is used to be displayed on a user apparatus of the movable platform. The three-dimensional data of the sampling point is collected by the carried point cloud sensor during movement of the movable platform, the sampling point is projected on the observation plane according to the three-dimensional data of the sampling point and the position and attitude data of the movable platform and/or the point cloud sensor during the collection of the sampling point, and the point cloud picture is generated according to the sampling point projected on the observation plane, such that when the point cloud picture is displayed on the user apparatus of the movable platform, a user may observe real-time reflection of the condition of the corresponding sampling point under the position and the attitude when the point cloud sensor on the movable platform collects the sampling point; when the position and the attitude of the movable platform and/or the point cloud sensor change in real time, the projection plane is re-determined and the projected picture may be generated every time the point cloud is collected, such that when the projected picture is displayed on the user apparatus of the movable platform, the user may observe that the currently-collected point cloud as displayed when the position and the attitude of the movable platform and/or the point cloud sensor change in real time.

The second main perspective: formation of the FPV may be adjusted according to the position and attitude change of the movable platform and/or the point cloud sensor. In short, when the movable platform moves and/or the position and the attitude of the point cloud sensor change, a point cloud view of the FPV currently displayed on a user interface also changes with the position and attitude change of the movable platform and/or the point cloud sensor. That is, three-dimensional data of a sampling point of a three-dimensional model in a target scene is acquired; the position and attitude data of the movable platform and/or the point cloud sensor carried by the movable platform relative to the target scene is acquired; the sampling point is projected onto the observation plane according to the three-dimensional data of the sampling point and the position and attitude data; and the point cloud picture is generated according to the sampling point projected onto the observation plane, and the point cloud picture is used to be displayed on the user apparatus of the movable platform. The three-dimensional data of the sampling point is the three-dimensional data of the sampling point of the three-dimensional model of the target scene, the position and attitude data is the position and attitude data of the movable platform and/or the point cloud sensor carried by the movable platform relative to the target scene, the sampling point is projected on the observation plane according to the three-dimensional data and the position and attitude data, the sampling point projected on the observation plane is collected by the movable platform and/or the point cloud sensor in a certain view, and the generated point cloud picture is also the point cloud picture of the sampling point collected by the movable platform and/or the point cloud sensor in a certain view, such that when the movable platform moves and/or the position and the attitude of the point cloud sensor change, with the position and attitude change of the movable platform and/or the point cloud sensor, the point cloud view in the FPV currently displayed on the user interface also changes.

The third main perspective: the collection process of the point cloud sensor of the movable platform may be monitored in real time, the position and the attitude of the movable platform and/or the point cloud sensor are monitored in real time, and the user may view the real-time collection process on the user interface. That is, the point cloud sensor of the movable platform is controlled to collect measurement data of the sampling point in the target scene, and the measurement data includes distance and/or orientation data of the sampling point relative to the point cloud sensor; the position and attitude data of the movable platform and/or the point cloud sensor in a geographic coordinate system during the collection of the sampling point is acquired; the three-dimensional data of the sampling point in the geographic coordinate system is determined according to the measurement data and the position and attitude data; the three-dimensional data of the sampling point may be projected on the observation plane corresponding to the position and attitude data, and generate the point cloud picture displayed on a user terminal of the movable platform. The point cloud sensor of the movable platform is controlled to collect the measurement data of the sampling point in the target scene, the three-dimensional data of the sampling point in the geographic coordinate system is determined according to the measurement data and the position and attitude data of the movable platform and/or the point cloud sensor in the geographic coordinate system during the collection of the sampling point, and the three-dimensional data of the sampling point may be projected on the observation plane corresponding to the position and attitude data, and generate the point cloud picture displayed on a user terminal of the movable platform, such that the user may view the real-time collection process of the point cloud sensor of the movable platform on the user interface.

Some exemplary embodiments of the present disclosure will be described in detail below with reference to the accompanying drawings. The following exemplary embodiments and features thereof may be combined with one another without conflicts.

The following mainly describes the data processing method according to some exemplary embodiments of the present disclosure from three different main perspectives.

The first main perspective: a currently collected point cloud is displayed according to a real-time change in a position and an attitude of a movable platform and/or a point cloud sensor, and every time a point cloud is collected, a projection plane is recalculated, and a projected picture is generated.

Referring to FIG. 1 which is a schematic flow diagram of a data processing method according to some exemplary embodiments of the present disclosure, and the method may include: step S101, step S102, step S103, and step S104.

Step S101: obtain three-dimensional data of a sampling point, the three-dimensional data of the sampling point is collected by a point cloud sensor carried by a movable platform during a movement of the movable platform.

The three-dimensional data may be data of a three-dimensional space, and may include three-dimensional position data. The three-dimensional data may be three-dimensional data relative to a coordinate system; specific data may be related to the coordinate system, specific three-dimensional data may be different in different coordinate systems, and the specific three-dimensional data in different coordinate systems may be converted to each other.

The movable platform may refer to various platforms which may move autonomously or under certain controlled conditions, for example, an unmanned aerial vehicle, a vehicle, an unmanned vehicle, a ground robot, an unmanned ship, a gimbal, or the like. The movable platform may also be a combination of the above platforms; for example, the unmanned aerial vehicle, the vehicle, the unmanned vehicle, the ground robot, the unmanned ship, or the like, may carry apparatuses or devices thereon to form the movable platform, and for example, the unmanned aerial vehicle may carry the gimbal to form the movable platform, and the point cloud sensor may be provided on the gimbal.

The point cloud may be a dataset of sampling points on a target surface obtained by a measuring instrument; the sample points may contain rich information including three-dimensional coordinates (XYZ), colors, classification values, intensity values, time, or the like. For example, a point cloud obtained according to a laser measurement principle may include three-dimensional coordinates (XYZ) and laser reflection intensity, a point cloud obtained according to a photogrammetry principle may include three-dimensional coordinates (XYZ) and color information (RGB), and a point cloud obtained by combining the laser measurement principle and the photogrammetry principle may include three-dimensional coordinates (XYZ), laser reflection intensity and color information. After acquisition of spatial coordinates of the sampling points on the target surface, a set of points may be obtained, which is called "point cloud".

The point cloud sensor (i.e., the measuring instrument) may be a sensor which may be configured to collect the sampling points on the target surface at least to obtain the three-dimensional data of the sampling points, and may include, but is not limited to, a lidar, a visible light camera, a multispectral camera, a millimeter wave radar, an ultrasonic radar, or the like, or a combination thereof.

The three-dimensional data of the sampling point may be directly calculated according to measurement data of the sampling point, or acquired during three-dimensional reconstruction through a two-dimensional image, or calculated with a three-dimensional model. A computing power resource required for the acquisition of the three-dimensional data of the sampling point may be a computing power resource of a movable platform or a load of the movable platform; or related data may be transmitted to a ground side apparatus (such as a PC, a tablet, a mobile apparatus, or the like) or a cloud in real time, and a calculation may be performed in real time utilizing a computing power resource of the ground side apparatus or the cloud; or the calculation may be performed utilizing a local computing power resource. That is, the three-dimensional data of the sampling point may be obtained from the movable platform, or acquired from the ground side apparatus or the cloud, or calculated using the local computing power resource.

The three-dimensional data of the sampling point may be collected by the point cloud sensor carried by the movable platform during the movement of the movable platform; a position and an attitude of the movable platform change during the movement, a position and an attitude of the point cloud sensor also change; the sampling point changes, and the three-dimensional data of the sampling point also changes.

Step S102: obtain first position and attitude data of the movable platform and/or the point cloud sensor when the sampling point is collected.

The position and attitude data may include position data and attitude data. The first position and attitude data may include position and attitude data of the movable platform and/or the point cloud sensor when the sampling point is collected. The point cloud sensor is arranged on the movable platform, the position and the attitude of the point cloud sensor may change with the change of the position and the attitude of the movable platform, and the position and the attitude of the point cloud sensor may also change by themselves. The first position and attitude data when the sampling point is collected may be the position and attitude data of the movable platform (the position and the attitude of the point cloud sensor change with the change of the position and the attitude of the movable platform), or position and attitude data of the point cloud sensor (the position and the attitude of the point cloud sensor are variable, and the position and the attitude of the movable platform are fixed), or position and attitude data of the movable platform and the point cloud sensor (the position and the attitude of the movable platform are variable, and the position and the attitude of the point cloud sensor are also variable). The first position and attitude data may be used to determine the FPV of the movable platform and/or the point cloud sensor for determining a projection plane. The first position and attitude data corresponding to a plurality of sampling points may be the same or different.

The first position and attitude data of the movable platform may be obtained by an attitude capturing system and a positioning system on the movable platform; if the attitude of the point cloud sensor is unchanged relative to the movable platform, the first position and attitude data of the movable platform is the first position and attitude data of the point cloud sensor when the sampling point is collected; if the attitude of the point cloud sensor is variable relative to the movable platform, the first position and attitude data is required to be determined by combining the positions and the attitudes of the movable platform and the point cloud sensor.

It should be noted that step S101 and step S102 have no obvious sequence relationship.

Step S103: project the sampling point onto an observation plane according to the three-dimensional data of the sampling point and the first position and attitude data.

Projection is a method in which projection lines pass through an object and are projected to a selected projection plane, and a pattern thereof is obtained on the projection plane. Projection may include orthographic projection and oblique projection. The orthographic projection means that a center line of the projection lines is perpendicular to the projection plane, and the oblique projection means that the projection center line of the projection lines is not perpendicular to the projection plane. In some exemplary embodiments, the projection plane may be the observation plane, and the observation plane may be a plane on which projection is performed in the FPV of the movable platform and/or the point cloud sensor, such that a user may subsequently observe a collection condition on a user apparatus. If the three-dimensional data is from different sources, the process of projecting the sampling point on the observation plane is not quite the same, the three-dimensional data in different coordinate systems is required to be converted, and finally converted into a camera coordinate system, and a three-dimensional point in the camera coordinate system is projected onto a point on the observation plane.

Step S104: generate a point cloud picture according to the sampling point projected onto the observation plane, the point cloud picture is configured to be displayed on a user apparatus of the movable platform.

The point cloud picture may refer to a picture including at least corresponding points on the observation plane at which the sampling points are projected, and may further include color information (for example, RGB), height values, reflectivity, or the like, of the corresponding points. The point cloud picture may be displayed on the user apparatus of the movable platform. In this way, the user may view the collection condition on the user apparatus as if the user feview it in person.

In some exemplary embodiments of the present disclosure, the three-dimensional data of the sampling point is acquired, and the three-dimensional data of the sampling point may be collected by the point cloud sensor carried by the movable platform in a movement process of the movable platform; the position and attitude data of the movable platform and/or the point cloud sensor is acquired during the collection of the sampling point; the sampling point is projected onto the observation plane according to the three-dimensional data of the sampling point and the position and attitude data; and the point cloud picture may be generated according to the sampling point projected onto the observation plane, and the point cloud picture may be displayed on the user apparatus of the movable platform. The three-dimensional data of the sampling point may be collected by the carried point cloud sensor during the movement of the movable platform, the sampling point may be projected on the observation plane according to the three-dimensional data of the sampling point and the position and attitude data of the movable platform and/or the point cloud sensor during the collection of the sampling point, and the point cloud picture may be generated according to the sampling point projected on the observation plane, such that when the point cloud picture is displayed on the user apparatus of the movable platform, the user may observe real-time condition of the corresponding sampling point of the position and the attitude when the point cloud sensor (for example, a lidar on an unmanned aerial vehicle) on the movable platform collects the sampling point; when the position and the attitude of the movable platform and/or the point cloud sensor change in real time, the projection plane may be re-determined and the projected picture may be generated every time the point cloud is collected, such that when the projected picture is displayed on the user apparatus of the movable platform, the user may observe that the currently-collected point cloud is displayed when the attitude of the movable platform and/or the point cloud sensor changes in real time.

Figure 2:
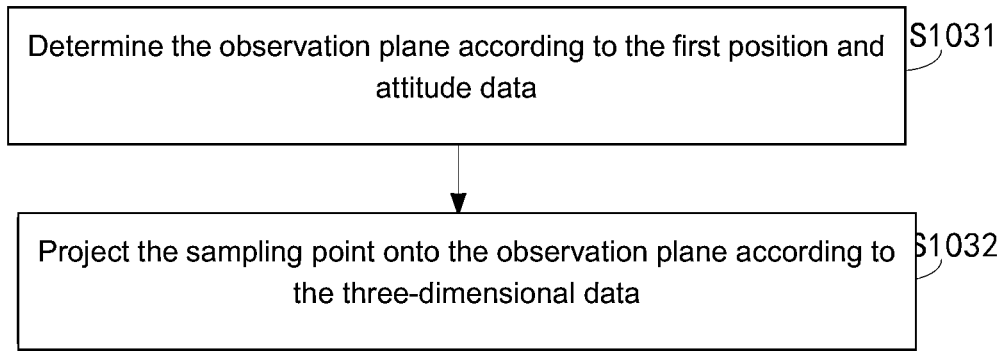
FIG. 2 is a schematic flow diagram of a data processing method according to some exemplary embodiments of the present disclosure.

Referring to FIG. 2, in some exemplary embodiments, the step S103 of projecting the sampling point onto the observation plane according to the three-dimensional data of the sampling point and the first position and attitude data may include: sub-step S1031 and sub-step S1032.

Sub-step S1031: determine the observation plane according to the first position and attitude data.

The first position and attitude data may be the position and attitude data of the movable platform and/or the point cloud sensor when the sampling point is collected, and the observation plane on which the projection is performed in the FPV of the movable platform and/or the point cloud sensor may be determined according to the first position and attitude data.

Sub-step S1032: project the sampling point onto the observation plane according to the three-dimensional data.

In this way, technical support may be provided to allow the user to view the collection condition on the user apparatus in the FPV of the movable platform and/or the point cloud sensor.

Figure 3:
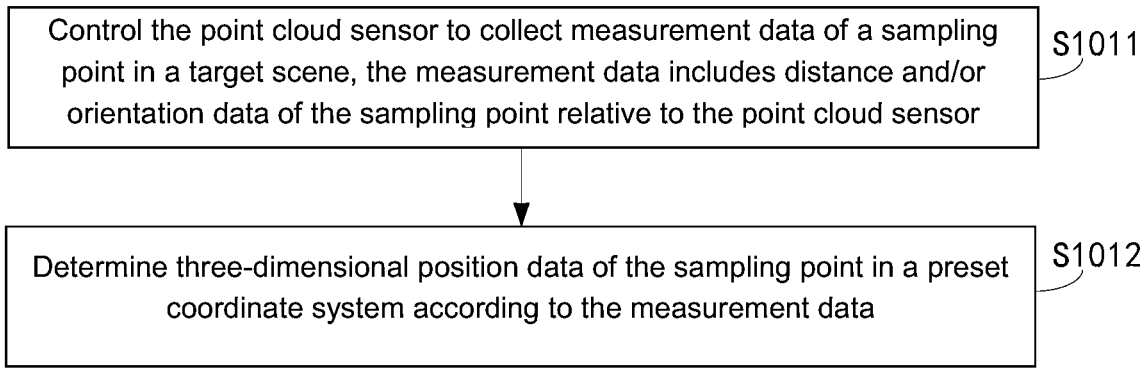
FIG. 3 is a schematic flow diagram of a data processing method according to some exemplary embodiments of the present disclosure.

Referring to FIG. 3, in some exemplary embodiments, the three-dimensional data of the sampling point may be acquired by controlling the point cloud sensor to collect the measurement data of the sampling point, and determining three-dimensional position data in a preset coordinate system according to the measurement data; that is, the step S101 of acquiring three-dimensional data of a sampling point may include: sub-step S1011 and sub-step S1012.

Sub-step S1011: control the point cloud sensor to collect measurement data of a sampling point in a target scene, the measurement data includes distance and/or orientation data of the sampling point relative to the point cloud sensor.

Sub-step S1012: determine three-dimensional position data of the sampling point in a preset coordinate system according to the measurement data.

In some exemplary embodiments, the sampling point may be an object point in the target scene measured by the point cloud sensor. The measurement data may include the distance and/or orientation data of the sampling point relative to the point cloud sensor; if the point cloud sensor has a fixed detection distance, the three-dimensional position data of the sampling point may be determined according to the orientation data.

The point cloud sensor may be controlled to collect the measurement data of the sampling point in the target scene, which means that the measurement data is obtained in real time by controlling the data collection in real time, and the three-dimensional position data of the sampling point in the preset coordinate system may be determined locally according to the measurement data. In this way, the user may monitor the collection of the sampling point by the point cloud sensor in real time on the user apparatus.

The preset coordinate system may be a geographic coordinate system or a body coordinate system of the movable platform.

Geographic coordinates are spherical coordinates representing a ground point position by latitude and longitude. The geographic coordinate system is a coordinate system in which an earth surface position is defined by a three-dimensional sphere to achieve a reference to the earth surface point position by longitude and latitude. In geodetics, there exist three types of the longitude and latitude in the geographic coordinate system: astronomical longitude and latitude, geodetic longitude and latitude and geocentric longitude and latitude. Therefore, the geographic coordinate system may include an astronomical coordinate system, a geodetic coordinate system and a geocentric coordinate system. For example: the geodetic coordinate system may include the Beijing coordinate system 1954, the China geodetic coordinate system 1980 and the China geodetic coordinate system 2000 (CGCS2000); the geocentric coordinate system may include the internationally adopted world geodetic system-1984 (WGS-84) coordinate system. In practical applications, the geographic coordinates may be converted according to different design calculation requirements in conjunction with characteristics of various coordinate systems, so as to facilitate utilization and decision asistance.

The body coordinate system of the movable platform may be a three-dimensional orthogonal rectangular coordinate system which is fixed on the movable platform and follows the right-hand rule, and an origin of the three-dimensional orthogonal rectangular coordinate system may be located at the centroid of the movable platform. With the unmanned aerial vehicle as an example, the body coordinate system of the unmanned aerial vehicle may be as follows: the OX axis is located on an unmanned aerial vehicle reference plane, is parallel with a body axis and points forward from the unmanned aerial vehicle, the OY axis is perpendicular to the unmanned aerial vehicle reference plane and points to the right of the unmanned aerial vehicle, and the OZ axis is perpendicular to the XOY plane in the reference plane and points down from unmanned aerial vehicle.

Figure 4:
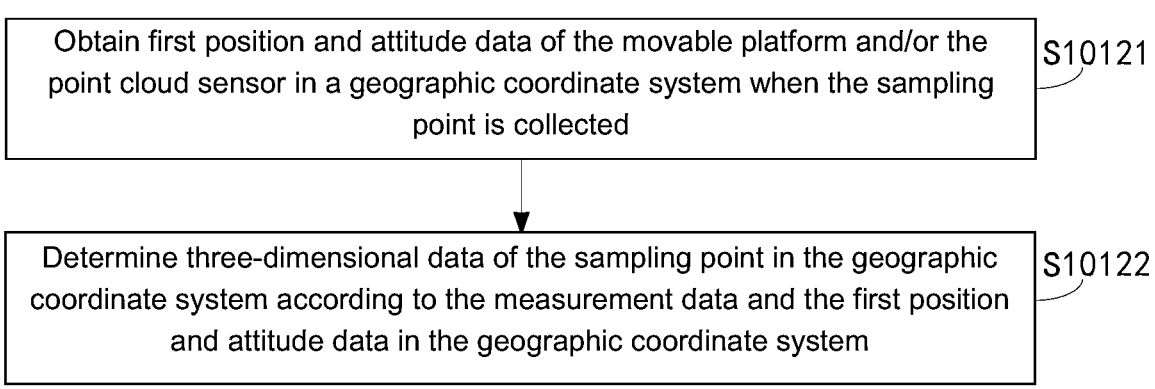
FIG. 4 is a schematic flow diagram of a data processing method according to some exemplary embodiments of the present disclosure.

Further, referring to FIG. 4, the sub-step S1012 of determining three-dimensional position data of the sampling point in a preset coordinate system according to the measurement data may further include: sub-step S10121 and sub-step S10122.

Sub-step S10121: obtain first position and attitude data of the movable platform and/or the point cloud sensor in a geographic coordinate system when the sampling point is collected.

Sub-step S10122: determine three-dimensional data of the sampling point in the geographic coordinate system according to the measurement data and the first position and attitude data in the geographic coordinate system.

For example, the point cloud sensor may be a laser sensor, and the laser sensor may acquire discrete distance measurement information with a laser ranging technology. In cooperation with an inertial navigation system (INS) which is fixedly connected with the laser sensor and has calibrated relative position and attitude, an absolute position (such as a position in the WGS-84 coordinate system) and an attitude (i.e., the first position and attitude data of the point cloud sensor in the geographic coordinate system) of the laser sensor in the space may be calculated through observation of a satellite and a base station, and then, an absolute position (i.e., the three-dimensional data of the sampling point in the geographic coordinate system) of the sampling point measured each time may be calculated, and the process may include the steps described below.

Pw is a three-dimensional point of a world coordinate system, PL is a three-dimensional point of a laser sensor coordinate system, and PL is projected into the INS through a rotation matrix $R_L^i$ (L→i) and a translation matrix $T_L^i$ (L→i) calibrated between the laser sensor and the INS, and then projected into the world coordinate system by the position and the attitude of the three-dimensional point estimated by the INS (i.e., a rotation matrix $R_i^w$ (i→w) and a translation matrix $T_i^w$ (i→w) from the INS to the world coordinate system).

$$P_w = \begin{bmatrix} R_i^w & T_i^w \\ 0 & 1 \end{bmatrix} \cdot \begin{bmatrix} R_L^i & T_L^i \\ 0 & 1 \end{bmatrix} \cdot P_L$$

After the above step, the three-dimensional positions of all the sampling points in the world coordinate system in the whole collection process may be acquired and stored in a memory as a three-dimensional point cloud.

The projection step is described below with a specific coordinate system.

(1) Knowing world coordinates of the point cloud, a transformation matrix (view matrix) is required in order to convert points with the world coordinates into points with camera coordinates:

$$P_c = T_w^c \cdot P_w$$

It should be noted that the points and the transformation are expressed by means of homogeneous coordinates $P_w$ and $P_c$ are homogeneous coordinates of the points in the world coordinate system and the camera coordinate system, and $T_w^c$ is the transformation matrix (view matrix) for transforming the points from the world coordinate system to the camera coordinate system. $T_w^c$ is from the self position and attitude ($T_w^i$) estimated by the INS and an external parameter ($T_i^c$) calibrated between the INS and a camera:

$$T_w^c = T_i^c \cdot T_w^i$$

Figure 5:
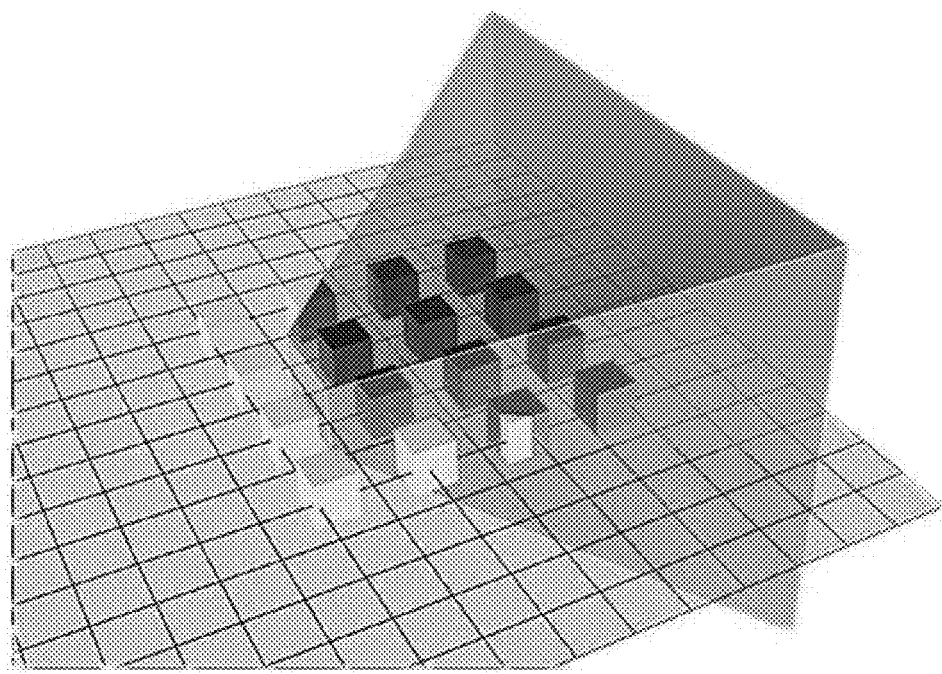
FIG. 5 is a schematic diagram of a point cloud picture in a data processing method according to some exemplary embodiments of the present disclosure.

(2) The points (three-dimensional) in the camera coordinate system are projected to the points (two-dimensional) in the observation plane. As shown in FIG. 5, before the projection, the sampling points in the target scene represented by the small squares in the drawing are all located in a video camera space (i.e., within a field angle range of the video camera), and the pyramid with the head truncated in the drawing represents a frustum of the video camera which is a visible region which may be actually viewed by the video camera. A projection formula for projecting the points (three-dimensional) in the camera coordinate system to the points (two-dimensional) in the observation plane is as follows:

$$P_{screen} = T_c^{screen} \cdot P_c \div (-z)$$

where $P_{screen}$ is coordinates of the point (two-dimensional) in the observation plane, and only x and y are taken; $T_c^{screen}$ is a projection matrix which projects the point of the camera coordinate system into the observation plane; $P_c$ is coordinates of the point (three-dimensional) in the camera coordinate system; the division by (−z) is used for normalizing $P_{screen}$, resulting in a perspective projection effect.

If the three-dimensional data of the point cloud in the coordinate system of the three-dimensional model is known, the three-dimensional data of the points in the coordinate system of the three-dimensional model may be firstly converted into the three-dimensional data of the points in the world coordinate system, and then, the projection may be performed based on the above steps.

In some exemplary embodiments, the generated point cloud picture may include the projection of one or more of the sampling points. When the generated point cloud picture includes the projection of the one or more sampling points, it may be shown that the one or more sampling points have the same observation plane, the FPVs of the movable platform corresponding to the one or more sampling points are basically the same, and every time one sampling point is collected, the projection of this sampling point may be added in the point cloud picture, such that the user may observe a dynamic process of the collection of the sampling point by the point cloud sensor in real time.

In some exemplary embodiments, a point cloud picture with color information may be produced; that is, the method may further include: acquiring color information of the sampling point projected on the observation plane. In this case, the step S104 of generating a point cloud picture according to the sampling point projected onto the observation plane may further include: generating the point cloud picture according to the color information of the sampling point on the observation plane.

A color has three features: hue, lightness and saturation. The color information may be information on hue, lightness, and saturation. Hue (i.e., an appearance or look of a color) may also be referred to as a name for distinguishing a color, such as red, yellow, green, gray, or the like. Lightness is a brightness difference degree of color, white has the highest lightness, and black has the lowest lightness. Saturation, also known as purity and chroma, refers to the saturation degree or purity degree of a color.

In some exemplary embodiments, the color information of the sampling point is acquired, such that the point cloud picture generated according to the color information of the sampling point on the observation plane may be more vivid, lively, rich and intuitive, thus improving the user experience.

The movable platform may also carry a visible light sensor, and the color information of the sampling point may be determined based on a visible light image of the visible light sensor formed by collecting the target scene.

The visible light sensor may be a sensitive electronic element, and may be a device which takes visible light as a detection object and converts the visible light into an output signal. The visible light sensor may include, but is not limited to, a photodiode, a phototransistor, a photoresistor, a complementary metal oxide semiconductor (CMOS) linear visible light sensor, or the like.

In some exemplary embodiments, the color information of the sampling point may be determined based on the visible light image of the visible light sensor formed by collecting the target scene, such that the point cloud picture generated according to the color information of the sampling point on the observation plane may objectively and truly reflect the color information of the sampling point, and the user may feel like being personally on the scene during observation using the user apparatus, thus improving the user experience.

Further, the method may further include: determining a pixel point corresponding to a same object point as the sampling point in the visible light image, and determining the color information of the sampling point according to a pixel value of the pixel point.

In this way, the color information of the sampling point may be represented objectively and truly.

The visible light sensor may be fixedly connected with the point cloud sensor. In this way, when the point cloud sensor collects the sampling point, the color information of the sampling point at this point may be collected.

Further, the visible light sensor may be fixedly connected with the point cloud sensor and carried on the movable platform by means of a gimbal structure, such that the visible light sensor may capture the real color information of the sampling point when the point cloud sensor collects the sampling point.

Figure 6:
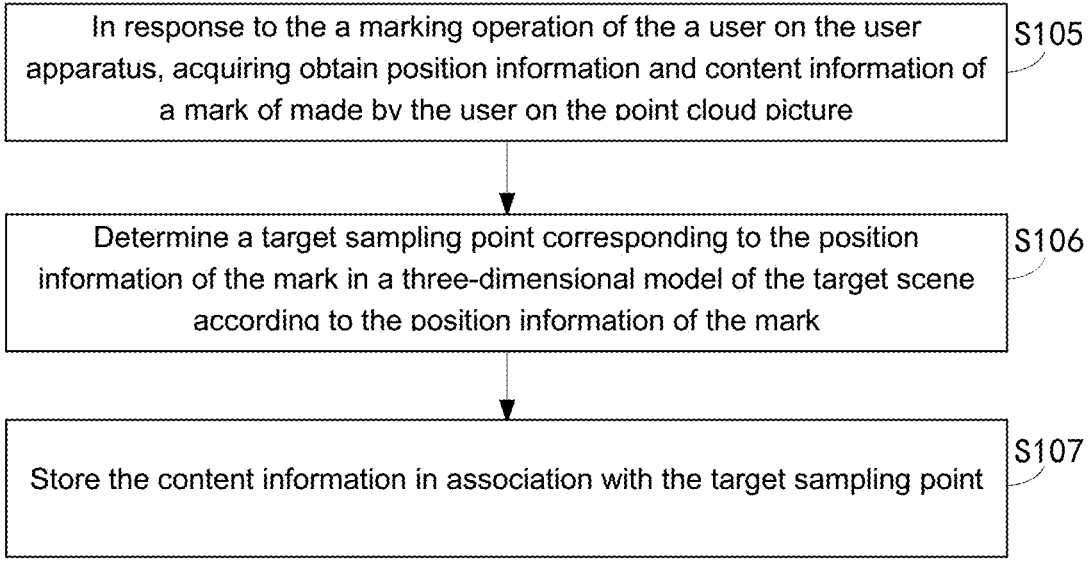
FIG. 6 is a schematic flow diagram of a data processing method according to some exemplary embodiments of the present disclosure.

Referring to FIG. 6, in some exemplary embodiments, the user may also perform a marking operation on the user apparatus, and a target sampling point corresponding to the marking operation may be determined in response to the marking operation. That is, the method may further include: step S105, step S106, and step S107.

Step S105: in response to a marking operation of a user on the user apparatus, obtain position information and content information of a mark made by the user on the point cloud picture.

Step S106: determine a target sampling point corresponding to the position information of the mark in a three-dimensional model of the target scene according to the position information of the mark.

Step S107: store the content information in association with the target sampling point.

In some exemplary embodiments, the three-dimensional model of the target scene may be further established, and after the position information and the content information of the corresponding mark are obtained in response to the marking operation of the user, the corresponding target sampling point may be determined in the three-dimensional model according to the position information of the mark, and the content information may be stored in association with the target sampling point, such that a corresponding relationship may be established between the target sampling point corresponding to the marking operation of the user and the content information, and the user may conveniently view the content information of the target sampling point subsequently.

The content information herein may include at least one of task information, type information, or status information.

The target sampling point may be one or more sampling points in the three-dimensional model. Since the marking operation of the user on the user apparatus is a marking operation on a two-dimensional plane, when the point corresponding to the marking operation on the two-dimensional plane is correspondingly transformed to the three-dimensional model, the target sampling point may be one or more sampling points in the three-dimensional model.

In some exemplary embodiments, the step S106 of determining a target sampling point corresponding to the position information of the mark in a three-dimensional model of the target scene according to the position information of the mark may further include: determining one or more target sampling points corresponding to the position information of the mark in the three-dimensional model according to the position information of the mark and a projection relationship of the currently displayed point cloud picture.

In the projection, the point of the three-dimensional space may be projected to the two-dimensional observation plane (i.e., the projection plane), and the projection may include orthographic projection and oblique projection. In the orthographic projection, a direction of the projection line may be a normal direction of the observation plane, be also a direction perpendicular to the Z-axis direction, and be also a FPV sight line direction. In the oblique projection, the direction of the projection line and the normal direction of the observation plane may form a preset angle, the direction of the projection line and the Z-axis direction may also form a preset angle, and the direction of the projection line and the FPV sight line direction may also form a preset angle. During either the orthographic or oblique projection, after projected to the two-dimensional projection plane along the projection line, one or more points in the three-dimensional space correspond to one two-dimensional point on the projection plane, and thus, after projection, one point on the two-dimensional observation plane may correspond to one or more points in the three-dimensional space.

In some exemplary embodiments, the position information of the mark may include a two-dimensional coordinate position of the point of the marking operation on the observation plane, and the step S106 of determining one or more target sampling points corresponding to the position information of the mark in the three-dimensional model according to the position information of the mark and a projection relationship of the currently displayed point cloud picture may further include: starting from the two-dimensional coordinate position of the observation plane, determining a sampling point closest to the observation plane in the three-dimensional model along a preset direction of the observation plane as the target sampling point.

In some exemplary embodiments, the preset direction along the observation plane may be the direction of the projection line, and in the three-dimensional model along the direction of the projection line, a plurality of sampling points in the three-dimensional model usually correspond to one projection point of the two-dimensional plane after projection. In turn, the projection point of the point of the marking operation by the user at the two-dimensional coordinate position on the observation plane may correspond to a plurality of sampling points in the three-dimensional model, and in order to determine a specific target sampling point, the sampling point in the three-dimensional model closest to the observation plane may be selected as the target sampling point.

The preset direction herein may be the normal direction of the observation plane, or may form a preset angle relative to the normal direction of the observation plane. When the preset direction is the normal direction of the observation plane, the orthographic projection may be adopted, and when the preset direction forms the preset angle relative to the normal direction of the observation plane, the oblique projection may be adopted.

Figure 7:
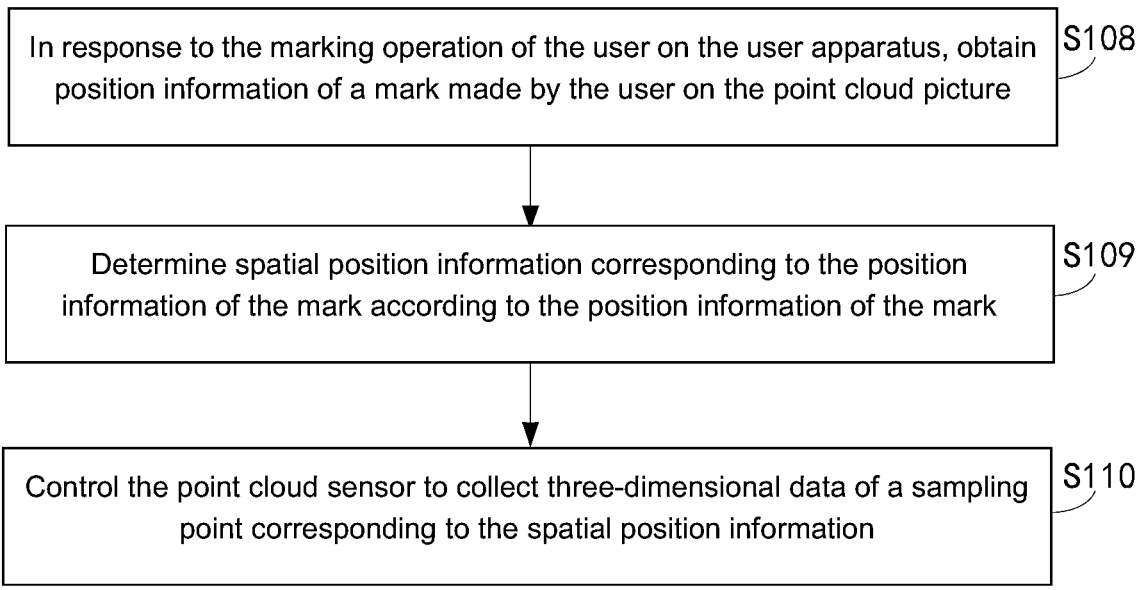
FIG. 7 is a schematic flow diagram of a data processing method according to some exemplary embodiments of the present disclosure.

Referring to FIG. 7, in some exemplary embodiments, based on the marking operation of the user on the user apparatus, the point cloud sensor may be controlled to collect three-dimensional data of a corresponding sampling point; that is, when the user observes the point cloud picture on the user apparatus, the point cloud sensor may be controlled to collect three-dimensional data of a specified sampling point according to the collection condition. Therefore, the method may further include: step S108, step S109, and step S110.

Step S108: in response to the marking operation of the user on the user apparatus, obtain position information of a mark made by the user on the point cloud picture.

Step S109: determine spatial position information corresponding to the position information of the mark according to the position information of the mark.

Step S110: control the point cloud sensor to collect three-dimensional data of a sampling point corresponding to the spatial position information.

In some exemplary embodiments, since the user performs the marking operation on the user apparatus, the position information of the mark on the point cloud picture may be obtained, and then, the spatial position information corresponding to the position information of the mark may be determined (that is, a specified region is determination), such that when the point cloud sensor is controlled to collect the three-dimensional data of the sampling point corresponding to the spatial position information, the collection of the point cloud sensor is specified and targeted. For example, when the user finds that collection quality does not meet a requirement, the collection may be performed again, or key targets may be focused in the collection. Since the collection region is the specified region corresponding to the spatial position information, compared with a collection region without a specified region, the collection region may be reduced, and a search range of the movable platform and/or the point cloud sensor may also be reduced.

The spatial position information may include three-dimensional coordinates.

Further, the step S110 of controlling the point cloud sensor to collect three-dimensional data of a sampling point corresponding to the spatial position information may further include: controlling the point cloud sensor to collect three-dimensional data of a sampling point corresponding to the three-dimensional coordinates in response to a trigger instruction indicating a sampling operation.

In some exemplary embodiments, the point cloud sensor may be controlled to collect the three-dimensional data of the sampling point corresponding to the three-dimensional coordinates in response to the trigger instruction indicating the sampling operation, such that the user may participate in the collection of the sampling point in the specified region in person, thus improving the user experience.

Figure 8:
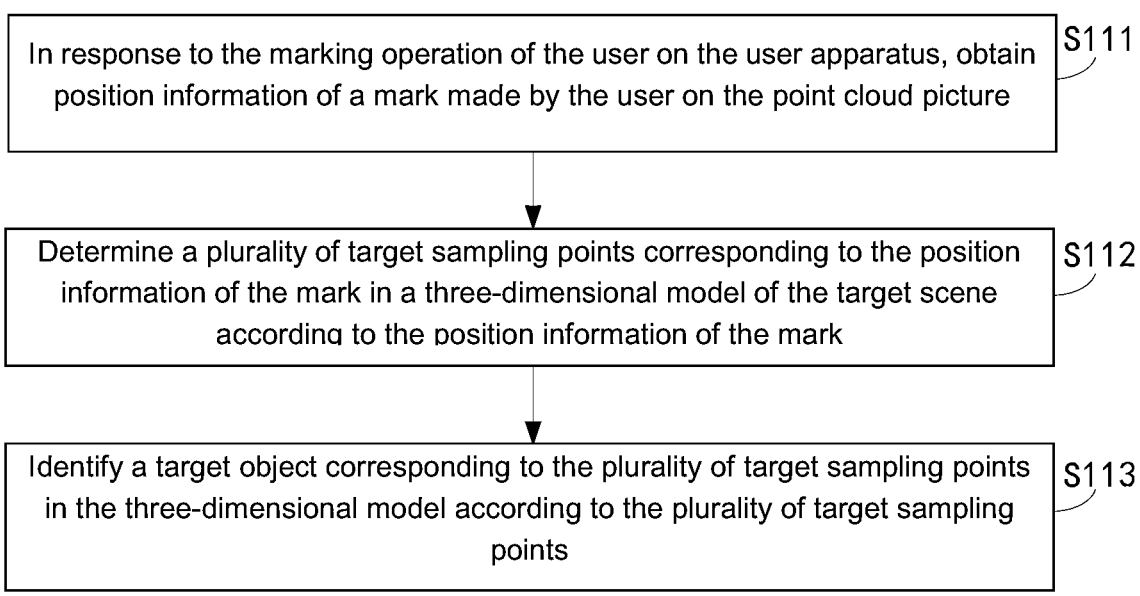
FIG. 8 is a schematic flow diagram of a data processing method according to some exemplary embodiments of the present disclosure.

Referring to FIG. 8, in some exemplary embodiments, a corresponding target object may also be identified based on the marking operation of the user on the user apparatus; that is, the method may further include: step S111, step S112, and step S113.

Step S111: in response to the marking operation of the user on the user apparatus, obtain position information of a mark made by the user on the point cloud picture.

Step S112: determine a plurality of target sampling points corresponding to the position information of the mark in a three-dimensional model of the target scene according to the position information of the mark.

Step S113: identify a target object corresponding to the plurality of target sampling points in the three-dimensional model according to the plurality of target sampling points.

After the target object is identified, the target object may be tracked by the movable platform; that is, the method may further include: controlling the movable platform to track the identified target object.

Figure 9:
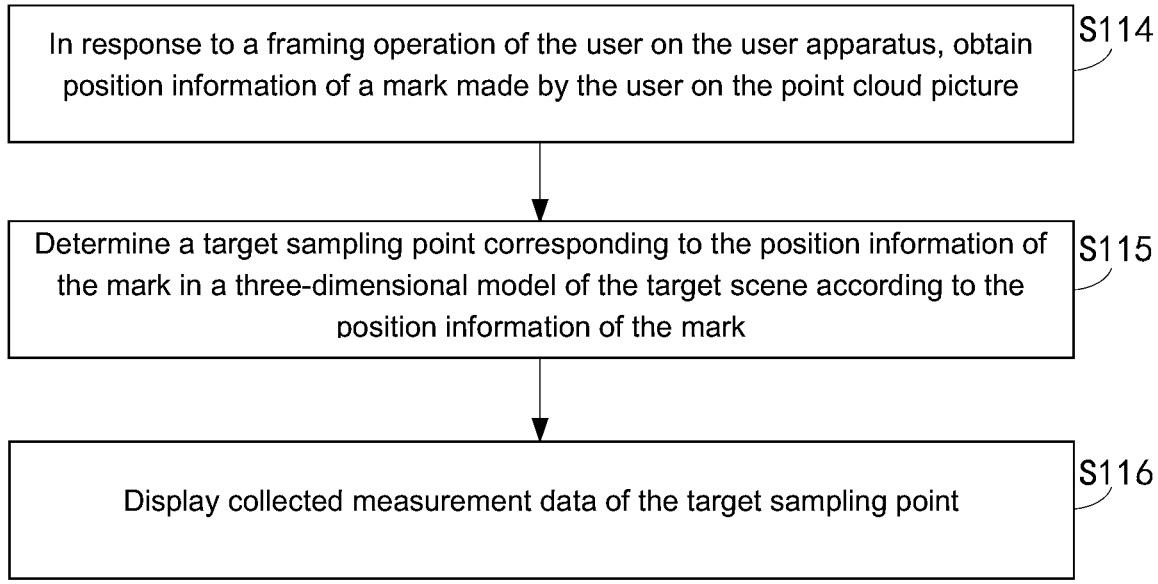
FIG. 9 is a schematic flow diagram of a data processing method according to some exemplary embodiments of the present disclosure.

Referring to FIG. 9, in some exemplary embodiments, based on a framing operation of the user on the user apparatus, the collected measurement data may be displayed, such that the user may conveniently make preliminary judgment on a state, a scale, or the like, of a key object subsequently; that is, the method may further include: step S114, step S115, and step S116.

Step S114: in response to a framing operation of the user on the user apparatus, obtain position information of a mark made by the user on the point cloud picture.

Step S115: determine a target sampling point corresponding to the position information of the mark in a three-dimensional model of the target scene according to the position information of the mark.

Step S116: display collected measurement data of the target sampling point.

In this way, the user may intuitively view the collected measurement data of the target sampling point, which may provide technical support for the user to make the preliminary judgment on the state, the scale, or the like, of the key object.

The second main perspective: formation of the FPV may be adjusted according to the position and attitude change of the movable platform and/or the point cloud sensor. In short, when the movable platform moves and/or the position and the attitude of the point cloud sensor change, a point cloud view of the FPV currently displayed on a user interface also changes with the attitude change of the movable platform and/or the point cloud sensor.

It should be noted that related content in the second main perspective and the related content in the first main perspective may share certain common contents, and for a detailed description thereof, reference may be made to the related content part of the first main perspective, which will not be repeated herein. The following mainly describes in detail the contents in the second main perspective different from the first main perspective.

Figure 10:
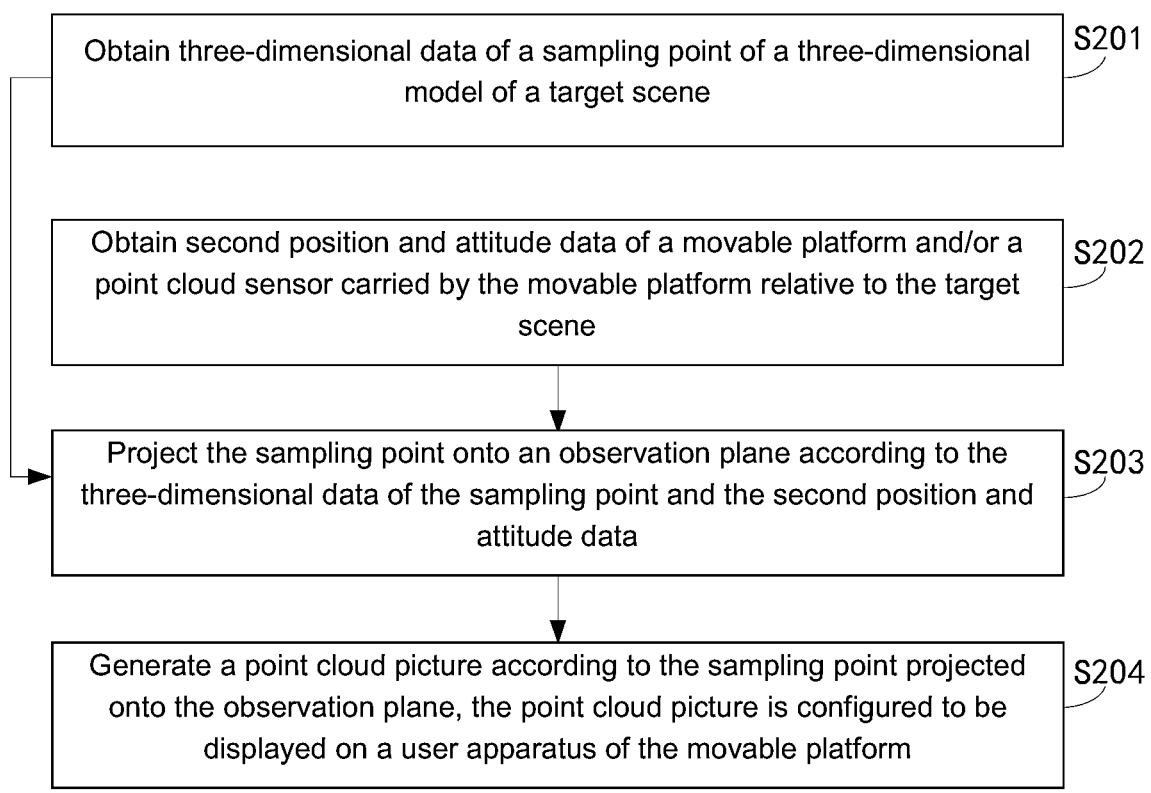
FIG. 10 is a schematic flow diagram of a data processing method according to some exemplary embodiments of the present disclosure.

Referring to FIG. 10 which is a schematic flow diagram of a data processing method according to some exemplary embodiments of the present disclosure, and the method may include: step S201, step S202, step S203, and step S204.

Step S201: obtain three-dimensional data of a sampling point of a three-dimensional model of a target scene.

In some exemplary embodiments, the three-dimensional data of the sampling point may be from the three-dimensional model of the target scene, and since the three-dimensional model of the target scene is constructed, when the three-dimensional data of the sampling point of the three-dimensional model of the target scene is obtained, the three-dimensional data of one or more sampling points in a certain viewing angle range may be obtained.

Step S202: obtain second position and attitude data of a movable platform and/or a point cloud sensor carried by the movable platform relative to the target scene.

In some exemplary embodiments, the second position and attitude data may be position and attitude data of the movable platform and/or the point cloud sensor carried by the movable platform relative to the target scene. For some second position and attitude data of the movable platform and/or the point cloud sensor carried by the movable platform relative to the target scene, one or more sampling points may be collected by the point cloud sensor carried by the movable platform.

It should be noted that step S201 and step S202 have no sequence relationship.

Step S203: project the sampling point onto an observation plane according to the three-dimensional data of the sampling point and the second position and attitude data.

Step S204: generate a point cloud picture according to the sampling point projected onto the observation plane, the point cloud picture is configured to be displayed on a user apparatus of the movable platform.

In some exemplary embodiments of the present disclosure, the three-dimensional data of the sampling point of the three-dimensional model of the target scene is acquired; the position and attitude data of the movable platform and/or the point cloud sensor carried by the movable platform relative to the target scene is acquired; the sampling point is projected onto the observation plane according to the three-dimensional data of the sampling point and the position and attitude data; and the point cloud picture is generated according to the sampling point projected onto the observation plane, and the point cloud picture is used to be displayed on the user apparatus of the movable platform. The three-dimensional data of the sampling point is the three-dimensional data of the sampling point of the three-dimensional model of the target scene, the second position and attitude data is the position and attitude data of the movable platform and/or the point cloud sensor carried by the movable platform relative to the target scene, the sampling point is projected on the observation plane according to the three-dimensional data and the position and attitude data, the sampling point projected on the observation plane is collected by the movable platform and/or the point cloud sensor in a certain view, and the generated point cloud picture is also the point cloud picture of the sampling point collected by the movable platform and/or the point cloud sensor in a certain view, such that when the movable platform moves and/or the position and the attitude of the point cloud sensor change, with the attitude change of the movable platform and/or the point cloud sensor, the point cloud view in the FPV currently displayed on the user interface also changes.

The step S203 of projecting the sampling point on an observation plane according to the three-dimensional data of the sampling point and the second position and attitude data may include: determining the observation plane according to the second position and attitude data; and projecting the sampling point onto the observation plane according to the three-dimensional data.

The three-dimensional data of the sampling point in the three-dimensional model may be collected in real time/in advance by the point cloud sensor carried by the movable platform.

The generated point cloud picture may include projection of one or more of the sampling points.

The method may further include: obtaining color information of the sampling point projected on the observation plane; at this point, the step S204 of generating a point cloud picture according to the sampling point projected onto the observation plane may include: generating the point cloud picture according to the color information of the sampling point on the observation plane.

The movable platform may also carry a visible light sensor, and the color information of the sampling point may be determined based on a visible light image of the visible light sensor formed by collecting the target scene.

The method may further include: determining a pixel point corresponding to a same object point as the sampling point in the visible light image, and determining the color information of the sampling point according to a pixel value of the pixel point, The visible light sensor may be fixedly connected with the point cloud sensor.

The visible light sensor may be fixedly connected with the point cloud sensor and carried on the movable platform by means of a gimbal structure, The method may further include: in response to a marking operation of the user on the user apparatus, acquiring position information and content information of a mark of the user on the point cloud picture; determining a target sampling point corresponding to the position information of the mark in the three-dimensional model of the target scene according to the position information of the mark; and storing the content information in association with the target sampling point.

The content information may include at least one of task information, type information, or status information.

The target sampling point may be one or more sampling points in the three-dimensional model.

The determining a target sampling point corresponding to the position information of the mark in the three-dimensional model of the target scene according to the position information of the mark may include: determining one or more target sampling points corresponding to the position information of the mark in the three-dimensional model according to the position information of the mark and a projection relationship of the currently displayed point cloud picture.

The position information of the mark may include a two-dimensional coordinate position of the point of the marking operation on the observation plane, and the determining one or more sampling points corresponding to the position information of the mark in the three-dimensional model according to the position information of the mark and a projection relationship of the currently displayed point cloud picture may include: starting from the two-dimensional coordinate position of the observation plane, determining a sampling point closest to the observation plane in the three-dimensional model along a preset direction of the observation plane as the target sampling point.

The preset direction may be the normal direction of the observation plane, or may form a preset angle relative to the normal direction of the observation plane.

The method may further include: in response to the marking operation of the user on the user apparatus, acquiring position information of a mark of the user on the point cloud picture; determining spatial position information corresponding to the position information of the mark according to the position information of the mark; and controlling the point cloud sensor to collect three-dimensional data of a sampling point corresponding to the spatial position information.

The spatial position information may include three-dimensional coordinates.

The controlling the point cloud sensor to collect three-dimensional data of a sampling point corresponding to the spatial position information may further include: controlling the point cloud sensor to collect three-dimensional data of a sampling point corresponding to the three-dimensional coordinates in response to a trigger instruction indicating a sampling operation.

The method may further include: in response to the marking operation of the user on the user apparatus, acquiring position information of a mark of the user on the point cloud picture; determining a plurality of target sampling points corresponding to the position information of the mark in the three-dimensional model of the target scene according to the position information of the mark; and identifying a target object corresponding to the plurality of target sampling points in the three-dimensional model according to the plurality of target sampling points.

The method may further include: controlling the movable platform to track the identified target object.

The method may further include: in response to a framing operation of the user on the user apparatus, acquiring position information of a mark of the user on the point cloud picture; determining a target sampling point corresponding to the position information of the mark in the three-dimensional model of the target scene according to the position information of the mark; and displaying the collected measurement data of the target sampling point.

The third main perspective: the collection process of the point cloud sensor of the movable platform may be monitored in real time, the attitude of the movable platform and/or the point cloud sensor may be monitored in real time, and the user may view the real-time collection process on the user interface.

It should be noted that related content in the third main perspective and the related content in the first main perspective and/or the related content in the second main perspective may share certain common contents, and for a detailed description thereof, reference may be made to the related content part of the first main perspective and/or the related content part of the second main perspective, which will not be repeated herein. The following mainly describes in detail the contents in the third main perspective different from the first main perspective and/or the second main perspective.

Figure 11:
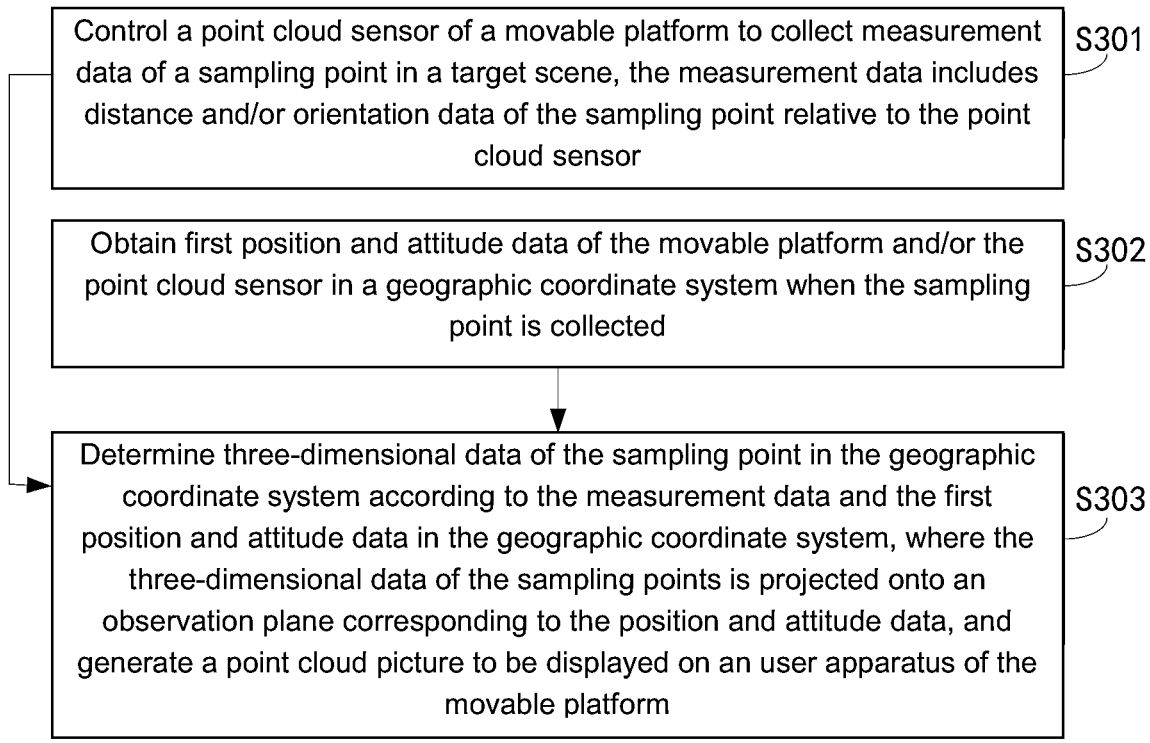
FIG. 11 is a schematic flow diagram of a data processing method according to some exemplary embodiments of the present disclosure.

Referring to FIG. 11 which is a schematic flow diagram of a data processing method according to some exemplary embodiments of the present disclosure, and the method may include: step S301, step S302, and step S303.

Step S301: control a point cloud sensor of a movable platform to collect measurement data of a sampling point in a target scene, the measurement data includes distance and/or orientation data of the sampling point relative to the point cloud sensor.

Step S302: obtain first position and attitude data of the movable platform and/or the point cloud sensor in a geographic coordinate system when the sampling point is collected.

It should be noted that step S301 and step S302 have no sequence relationship.

Step S303: determine three-dimensional data of the sampling point in the geographic coordinate system according to the measurement data and the first position and attitude data in the geographic coordinate system, where the three-dimensional data of the sampling points is projected onto an observation plane corresponding to the position and attitude data, and generate a point cloud picture to be displayed on an user apparatus of the movable platform.

In some exemplary embodiments, the point cloud sensor of the movable platform may be locally controlled to collect the measurement data of the sampling point in the target scene, and the first position and attitude data of the movable platform and/or the point cloud sensor in the geographic coordinate system when the sampling point is collected may be obtained, thus determining the three-dimensional data of the sampling point in the geographic coordinate system. The three-dimensional data of the sampling point may be specifically projected on the observation plane corresponding to the position and attitude data and generating the point cloud picture displayed on the user apparatus of the movable platform. The process that the three-dimensional data of the sampling point is projected onto the observation plane corresponding to the position and attitude data and generates the point cloud picture may be executed locally, or with other ground side apparatuses (such as a PC, a tablet, a mobile apparatus, or the like) or a cloud.

In some exemplary embodiments of the present disclosure, the point cloud sensor of the movable platform may be controlled to collect the measurement data of the sampling point in the target scene, and the measurement data may include the distance and/or orientation data of the sampling point relative to the point cloud sensor; the position and attitude data of the movable platform and/or the point cloud sensor in the geographic coordinate system during the collection of the sampling point is acquired; the three-dimensional data of the sampling point in the geographic coordinate system may be determined according to the measurement data and the position and attitude data; the three-dimensional data of the sampling point may be projected on the observation plane corresponding to the position and attitude data, and generate the point cloud picture displayed on a user terminal of the movable platform. The point cloud sensor of the movable platform is controlled to collect the measurement data of the sampling point in the target scene, the three-dimensional data of the sampling point in the geographic coordinate system may be determined according to the measurement data and the position and attitude data of the movable platform and/or the point cloud sensor in the geographic coordinate system during the collection of the sampling point, and the three-dimensional data of the sampling point may be projected on the observation plane corresponding to the position and attitude data, and generate the point cloud picture displayed on the user terminal of the movable platform, such that the user may view the real-time collection process of the point cloud sensor of the movable platform on the user interface.

The method may further include: projecting the sampling point on the observation plane according to the three-dimensional data of the sampling point and the first position and attitude data in the geographic coordinate system; and generating the point cloud picture according to the sampling point projected onto the observation plane, and displaying the point cloud picture on the user apparatus of the movable platform.

The generated point cloud picture may include the projection of one or more of the sampling points.

The method may further include: acquiring color information of the sampling point projected on the observation plane; the generating a point cloud picture according to the sampling point projected onto the observation plane may include: generating the point cloud picture according to the color information of the sampling point on the observation plane.

The movable platform may also carry a visible light sensor, and the color information of the sampling point may be determined based on a visible light image of the visible light sensor formed by collecting the target scene.

The method may further include: determining a pixel point corresponding to a same object point as the sampling point in the visible light image, and determining the color information of the sampling point according to a pixel value of the pixel point, The visible light sensor may be fixedly connected with the point cloud sensor.

The visible light sensor may be fixedly connected with the point cloud sensor and carried on the movable platform by means of a gimbal structure, The method may further include: in response to a marking operation of the user on the user apparatus, acquiring position information and content information of a mark of the user on the point cloud picture; determining a target sampling point corresponding to the position information of the mark in the three-dimensional model of the target scene according to the position information of the mark; and storing the content information in association with the target sampling point.

The content information may include at leaste one of task information, type information, or status information.

The target sampling point may be one or more sampling points in the three-dimensional model.

The determining of the target sampling point corresponding to the position information of the mark in the three-dimensional model of the target scene according to the position information of the mark may include: determining one or more target sampling points corresponding to the position information of the mark in the three-dimensional model according to the position information of the mark and a projection relationship of the currently displayed point cloud picture.

The position information of the mark may include a two-dimensional coordinate position of the point of the marking operation on the observation plane, and the determining of one or more sampling points corresponding to the position information of the mark in the three-dimensional model according to the position information of the mark and the projection relationship of the currently displayed point cloud picture may include: starting from the two-dimensional coordinate position of the observation plane, determining a sampling point closest to the observation plane in the three-dimensional model along a preset direction of the observation plane as the target sampling point.

The preset direction may be the normal direction of the observation plane, or may form a preset angle relative to the normal direction of the observation plane.

The method may further include: in response to the marking operation of the user on the user apparatus, acquiring position information of a mark of the user on the point cloud picture; determining spatial position information corresponding to the position information of the mark according to the position information of the mark; and controlling the point cloud sensor to collect three-dimensional data of a sampling point corresponding to the spatial position information.

The spatial position information may include three-dimensional coordinates.

The controlling of the point cloud sensor to collect three-dimensional data of a sampling point corresponding to the spatial position information may further include: controlling the point cloud sensor to collect three-dimensional data of a sampling point corresponding to the three-dimensional coordinates in response to a trigger instruction indicating a sampling operation.

The method may further include: in response to the marking operation of the user on the user apparatus, acquiring position information of a mark of the user on the point cloud picture; determining a plurality of target sampling points corresponding to the position information of the mark in the three-dimensional model of the target scene according to the position information of the mark; and identifying a target object corresponding to the plurality of target sampling points in the three-dimensional model according to the plura target sampling points.

The method may further include: controlling the movable platform to track the identified target object.

The method may further include: in response to a framing operation of the user on the user apparatus, acquiring position information of a mark of the user on the point cloud picture; determining a target sampling point corresponding to the position information of the mark in the three-dimensional model of the target scene according to the position information of the mark; and displaying the collected measurement data of the target sampling point.

Figure 12:
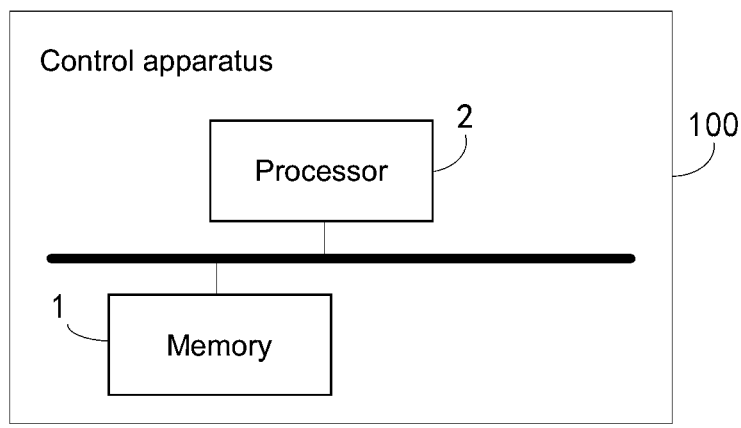
FIG. 12 is a schematic structural diagram of a control apparatus according to some exemplary embodiments of the present disclosure.

Referring to FIG. 12 which is a schematic structural diagram of a control apparatus according to some exemplary embodiments of the present disclosure; it should be noted that the control apparatus according to some exemplary embodiments may execute the steps in the data processing method in the first main perspective, and for details of relevant content, reference may be made to the relevant content of the data processing method in the first main perspective, which will not be repeated herein.

The control apparatus 100 may include: at least one memory 1 and at least one processor 2; the processor 2 and the memory 1 may be connected by a bus.

The processor 2 may be a micro control unit, a central processing unit, a digital signal processor, or the like.

The memory 1 may be a flash chip, a read-only memory, a magnetic disk, an optical disk, a USB flash disk, a mobile hard disk, or the like.

The memory 1 may be configured to store a computer program; the processor 2 may be configured to execute the computer program and, when executing the computer program, to implement the following steps:

acquiring three-dimensional data of a sampling point, the three-dimensional data of the sampling point being collected by a point cloud sensor carried by a movable platform during movement of the movable platform; acquiring first position and attitude data of the movable platform and/or the point cloud sensor when the sampling point is collected; projecting the sampling point on an observation plane according to the three-dimensional data of the sampling point and the first position and attitude data; and generating a point cloud picture according to the sampling point projected onto the observation plane, the point cloud picture being used to be displayed on a user apparatus of the movable platform.

When executing the computer program, the processor may implement the following steps: determining the observation plane according to the first position and attitude data; and projecting the sampling point onto the observation plane according to the three-dimensional data.

When executing the computer program, the processor may implement the following steps: controlling the point cloud sensor to collect measurement data of a sampling point in a target scene, the measurement data including distance and/or orientation data of the sampling point relative to the point cloud sensor; and determining three-dimensional position data of the sampling point in a preset coordinate system according to the measurement data.

The preset coordinate system may be a geographic coordinate system or a body coordinate system of the movable platform.

When executing the computer program, the processor may implement the following steps: acquiring first position and attitude data of the movable platform and/or the point cloud sensor in the geographic coordinate system when the sampling point is collected; and determining three-dimensional position data of the sampling point in the geographic coordinate system according to the measurement data and the first position and attitude data in the geographic coordinate system.

The generated point cloud picture may include the projection of one or more of the sampling points.

When executing the computer program, the processor may implement the following steps: acquiring color information of the sampling point projected on the observation plane; and generating the point cloud picture according to the color information of the sampling point on the observation plane.

The movable platform may also carry a visible light sensor, and the color information of the sampling point may be determined based on a visible light image of the visible light sensor formed by collecting the target scene.

When executing the computer program, the processor may implement the following steps: determining a pixel point corresponding to a same object point as the sampling point in the visible light image, and determining the color information of the sampling point according to a pixel value of the pixel point.

The visible light sensor may be fixedly connected with the point cloud sensor.

The visible light sensor may be fixedly connected with the point cloud sensor and carried on the movable platform by means of a gimbal structure, When executing the computer program, the processor may implement the following steps: in response to a marking operation of the user on the user apparatus, acquiring position information and content information of a mark of the user on the point cloud picture; determining a target sampling point corresponding to the position information of the mark in the three-dimensional model of the target scene according to the position information of the mark; and storing the content information in association with the target sampling point.

The content information may include at least one of task information, type information, or status information.

The target sampling point may be one or more sampling points in the three-dimensional model.

When executing the computer program, the processor may implement the following step: determining one or more target sampling points corresponding to the position information of the mark in the three-dimensional model according to the position information of the mark and a projection relationship of the currently displayed point cloud picture.

The position information of the mark may include a two-dimensional coordinate position of the point of the marking operation on the observation plane, and when executing the computer program, the processor may implement the following step: starting from the two-dimensional coordinate position of the observation plane, determining a sampling point closest to the observation plane in the three-dimensional model along a preset direction of the observation plane as the target sampling point.

The preset direction may be the normal direction of the observation plane, or form a preset angle relative to the normal direction of the observation plane.

When executing the computer program, the processor may implement the following steps: in response to the marking operation of the user on the user apparatus, acquiring position information of a mark of the user on the point cloud picture; determining spatial position information corresponding to the position information of the mark according to the position information of the mark; and controlling the point cloud sensor to collect three-dimensional data of a sampling point corresponding to the spatial position information.

The spatial position information may include three-dimensional coordinates.

When executing the computer program, the processor may implement the following step: controlling the point cloud sensor to collect three-dimensional data of a sampling point corresponding to the three-dimensional coordinates in response to a trigger instruction indicating a sampling operation.

When executing the computer program, the processor may implement the following steps: in response to the marking operation of the user on the user apparatus, acquiring position information of a mark of the user on the point cloud picture; determining a plurality of target sampling points corresponding to the position information of the mark in the three-dimensional model of the target scene according to the position information of the mark; and identifying a target object corresponding to the plurality of target sampling points in the three-dimensional model according to the plurality of target sampling points.

When executing the computer program, the processor may implement the following step: controlling the movable platform to track the identified target object.

When executing the computer program, the processor may implement the following steps: in response to a framing operation of the user on the user apparatus, acquiring position information of a mark of the user on the point cloud picture; determining a target sampling point corresponding to the position information of the mark in the three-dimensional model of the target scene according to the position information of the mark; and displaying the collected measurement data of the target sampling point.

The present disclosure may further provides a control apparatus; it should be noted that the control apparatus according to some exemplary embodiments may execute the steps in the data processing method in the second main perspective, and for details of relevant content, reference may be made to the relevant content of the data processing method in the second main perspective, which will not be repeated herein.

The control apparatus may include: at least a memory and at least a processor; the processor and the memory may be connected by a bus.

The processor may be a micro control unit, a central processing unit, a digital signal processor, or the like.

The memory may be a flash chip, a read-only memory, a magnetic disk, an optical disk, a USB flash disk, a mobile hard disk, or the like.

The memory may be configured to store a computer program; the processor may be configured to execute the computer program and, when executing the computer program, to implement the following steps:

acquiring three-dimensional data of a sampling point of a three-dimensional model of a target scene; acquiring second position and attitude data of a movable platform and/or a point cloud sensor carried by the movable platform relative to the target scene; projecting the sampling point on an observation plane according to the three-dimensional data of the sampling point and the second position and attitude data; and generating a point cloud picture according to the sampling point projected onto the observation plane, the point cloud picture being used to be displayed on a user apparatus of the movable platform.

When executing the computer program, the processor may implement the following steps: determining the observation plane according to the second position and attitude data; and projecting the sampling point onto the observation plane according to the three-dimensional data.

The three-dimensional data of the sampling point in the three-dimensional model is collected in real time/in advance by the point cloud sensor carried by the movable platform.

The generated point cloud picture may include projection of one or more of the sampling points.

When executing the computer program, the processor may implement the following steps: acquiring color information of the sampling point projected on the observation plane; and generating the point cloud picture according to the color information of the sampling point on the observation plane.

The movable platform may also carry a visible light sensor, and the color information of the sampling point may be determined based on a visible light image of the visible light sensor formed by collecting the target scene.

When executing the computer program, the processor may implement the following steps: determining a pixel point corresponding to a same object point as the sampling point in the visible light image, and determining the color information of the sampling point according to a pixel value of the pixel point.

The visible light sensor may be fixedly connected with the point cloud sensor.

The visible light sensor may be fixedly connected with the point cloud sensor and carried on the movable platform by means of a gimbal structure, When executing the computer program, the processor may implement the following steps: in response to a marking operation of the user on the user apparatus, acquiring position information and content information of a mark of the user on the point cloud picture; determining a target sampling point corresponding to the position information of the mark in the three-dimensional model of the target scene according to the position information of the mark; and storing the content information in association with the target sampling point.

The content information may include at least one of task information, type information, or status information.

The target sampling point may be one or more sampling points in the three-dimensional model.

When executing the computer program, the processor may implement the following step: determining one or more target sampling points corresponding to the position information of the mark in the three-dimensional model according to the position information of the mark and a projection relationship of the currently displayed point cloud picture.

The position information of the mark may include a two-dimensional coordinate position of the point of the marking operation on the observation plane, and when executing the computer program, the processor may implement the following step: starting from the two-dimensional coordinate position of the observation plane, determining a sampling point closest to the observation plane in the three-dimensional model along a preset direction of the observation plane as the target sampling point.

The preset direction may be the normal direction of the observation plane, or form a preset angle relative to the normal direction of the observation plane.

When executing the computer program, the processor may implement the following steps: in response to the marking operation of the user on the user apparatus, acquiring position information of a mark of the user on the point cloud picture; determining spatial position information corresponding to the position information of the mark according to the position information of the mark; and controlling the point cloud sensor to collect three-dimensional data of a sampling point corresponding to the spatial position information.

The spatial position information may include three-dimensional coordinates.

When executing the computer program, the processor may implement the following step: controlling the point cloud sensor to collect three-dimensional data of a sampling point corresponding to the three-dimensional coordinates in response to a trigger instruction indicating a sampling operation.

When executing the computer program, the processor may implement the following steps: in response to the marking operation of the user on the user apparatus, acquiring position information of a mark of the user on the point cloud picture; determining a plurality of target sampling points corresponding to the position information of the mark in the three-dimensional model of the target scene according to the position information of the mark; and identifying a target object corresponding to the plurality of target sampling points in the three-dimensional model according to the plurality of target sampling points.

When executing the computer program, the processor may implement the following step: controlling the movable platform to track the identified target object.

When executing the computer program, the processor may implement the following steps: in response to a framing operation of the user on the user apparatus, acquiring position information of a mark of the user on the point cloud picture; determining a target sampling point corresponding to the position information of the mark in the three-dimensional model of the target scene according to the position information of the mark; and displaying the collected measurement data of the target sampling point.

The present disclosure further provides a control apparatus; it should be noted that the control apparatus according to some exemplary embodiments may execute the steps in the data processing method in the third main perspective, and for details of relevant content, reference may be made to the relevant content of the data processing method in the third main perspective, which is not repeated here.

The control apparatus may include: at least a memory and at least a processor; the processor and the memory may be connected by a bus.

The processor may be a micro control unit, a central processing unit, a digital signal processor, or the like.

The memory may be a flash chip, a read-only memory, a magnetic disk, an optical disk, a USB flash disk, a mobile hard disk, or the like.

The memory may be configured to store a computer program; the processor may be configured to execute the computer program and, when executing the computer program, to implement the following steps:

controlling a point cloud sensor of a movable platform to collect measurement data of a sampling point in a target scene, the measurement data including distance and/or orientation data of the sampling point relative to the point cloud sensor; acquiring first position and attitude data of the movable platform and/or the point cloud sensor in a geographic coordinate system when the sampling point is collected; determining three-dimensional data of the sampling point in the geographic coordinate system according to the measurement data and the first position and attitude data in the geographic coordinate system, the three-dimensional data of the sampling points being used for being projected on an observation plane corresponding to the position and attitude data and generating a point cloud picture displayed on an user apparatus of the movable platform.

When executing the computer program, the processor may implement the following steps: projecting the sampling point on the observation plane according to the three-dimensional data of the sampling point and the first position and attitude data in the geographic coordinate system; and generating the point cloud picture according to the sampling point projected onto the observation plane, the point cloud picture being used to be displayed on the user apparatus of the movable platform.

The generated point cloud picture may include projection of one or more of the sampling points.

When executing the computer program, the processor may implement the following steps: acquiring color information of the sampling point projected on the observation plane; and generating the point cloud picture according to the color information of the sampling point on the observation plane.

The movable platform may also carry a visible light sensor, and the color information of the sampling point may be determined based on a visible light image of the visible light sensor formed by collecting the target scene.

When executing the computer program, the processor may implement the following steps: determining a pixel point corresponding to a same object point as the sampling point in the visible light image, and determining the color information of the sampling point according to a pixel value of the pixel point.

The visible light sensor may be fixedly connected with the point cloud sensor.

The visible light sensor may be fixedly connected with the point cloud sensor and carried on the movable platform by means of a gimbal structure, When executing the computer program, the processor may implement the following steps: in response to a marking operation of the user on the user apparatus, acquiring position information and content information of a mark of the user on the point cloud picture; determining a target sampling point corresponding to the position information of the mark in the three-dimensional model of the target scene according to the position information of the mark; and storing the content information in association with the target sampling point.

The content information may include at least one of task information, type information, or status information.

The target sampling point may be one or more sampling points in the three-dimensional model.

When executing the computer program, the processor may implement the following step: determining one or more target sampling points corresponding to the position information of the mark in the three-dimensional model according to the position information of the mark and a projection relationship of the currently displayed point cloud picture.

The position information of the mark may include a two-dimensional coordinate position of the point of the marking operation on the observation plane, and when executing the computer program, the processor may implement the following step: starting from the two-dimensional coordinate position of the observation plane, determining a sampling point closest to the observation plane in the three-dimensional model along a preset direction of the observation plane as the target sampling point.

The preset direction may be the normal direction of the observation plane, or form a preset angle relative to the normal direction of the observation plane.

When executing the computer program, the processor may implement the following steps: in response to the marking operation of the user on the user apparatus, acquiring position information of a mark of the user on the point cloud picture; determining spatial position information corresponding to the position information of the mark according to the position information of the mark; and controlling the point cloud sensor to collect three-dimensional data of a sampling point corresponding to the spatial position information.

The spatial position information may include three-dimensional coordinates.

When executing the computer program, the processor may implement the following step: controlling the point cloud sensor to collect three-dimensional data of a sampling point corresponding to the three-dimensional coordinates in response to a trigger instruction indicating a sampling operation.

When executing the computer program, the processor may implement the following steps: in response to the marking operation of the user on the user apparatus, acquiring position information of a mark of the user on the point cloud picture; determining a plurality of target sampling points corresponding to the position information of the mark in the three-dimensional model of the target scene according to the position information of the mark; and identifying a target object corresponding to the plurality of target sampling points in the three-dimensional model according to the plurality of target sampling points.

When executing the computer program, the processor may implement the following step: controlling the movable platform to track the identified target object.

When executing the computer program, the processor may implement the following steps: in response to a framing operation of the user on the user apparatus, acquiring position information of a mark of the user on the point cloud picture; determining a target sampling point corresponding to the position information of the mark in the three-dimensional model of the target scene according to the position information of the mark; and displaying the collected measurement data of the target sampling point.

The present disclosure further provides a computer-readable storage medium having a computer program stored thereon, and the computer program, when executed by the processor, causes the processor to implement any data processing method of the above first main perspective. For a detailed description of related content, reference may be made to the related content section above, which will not be repeated herein.

The computer-readable storage medium may be an internal storage unit, such as a hard disk or memory, of the control apparatus corresponding to the first main perspective. The computer-readable storage medium may also be an external storage apparatus, such as an equipped plug-in type hard disk, smart memory card, secure digital card, flash memory card, or the like.

The present disclosure further provides another computer-readable storage medium having a computer program stored thereon, and the computer program, when executed by the processor, causes the processor to implement any data processing method of the above second main perspective. For a detailed description of related content, reference may be made to the related content section above, which will not be repeated herein.

The computer-readable storage medium may be an internal storage unit, such as a hard disk or memory, of the control apparatus corresponding to the second main perspective. The computer-readable storage medium may also be an external storage apparatus, such as an equipped plug-in type hard disk, smart memory card, secure digital card, flash memory card, or the like.

The present disclosure further provides still another computer-readable storage medium having a computer program stored thereon, and the computer program, when executed by the processor, causes the processor to implement any data processing method of the above third main perspective. For a detailed description of related content, reference may be made to the related content section above, which is not repeated herein.

The computer-readable storage medium may be an internal storage unit, such as a hard disk or memory, of the control apparatus corresponding to the third main perspective. The computer-readable storage medium may also be an external storage apparatus, such as an equipped plug-in type hard disk, smart memory card, secure digital card, flash memory card, or the like.

It is understood that the terminology used in the present disclosure is for the purpose of describing particular embodiments only, and is not intended to limit the present disclosure.

It should be understood that the term "and/or" as used in the present disclosure and the appended claims refers to any and all possible combinations of one or more of the associated listed items and includes such combinations.

The foregoing descriptions are only some specific exemplary embodiments of the present disclosure, but are not intended to limit the scope of protection the present disclosure. Various equivalent modifications or replacements may be readily figured out by persons skilled in the art within the technical scope disclosed in the present disclosure, and shall all fall within the scope of protection of the present disclosure. Therefore, the scope of protection of the present disclosure shall be subject to the scope of protection of the claims.

What is claimed is:

1. A data processing method, implemented by a control apparatus associated with a movable platform, comprising:
   obtaining, by the control apparatus, three-dimensional data of at least one sampling point collected by a point cloud sensor carried by the movable platform during a movement of the movable platform;
   obtaining, by the control apparatus, first position and attitude data of at least one of the movable platform, or the point cloud sensor during the collecting of the at least one sampling point;
   projecting, by the control apparatus, the at least one sampling point onto an observation plane according to the three-dimensional data of the at least one sampling point and the first position and attitude data;
   generating, by the control apparatus, a point cloud picture according to the at least one sampling point projected onto the observation plane; and
   rendering, by the control apparatus, a user apparatus of the movable platform to display the point cloud picture.

2. The method according to claim 1, wherein the projecting of the at least one sampling point onto the observation plane according to the three-dimensional data of the at least one sampling point and the first position and attitude data includes:
   determining the observation plane according to the first position and attitude data; and
   projecting the at least one sampling point onto the observation plane according to the three-dimensional data.

3. The method according to claim 1, wherein the obtaining of the three-dimensional data of the at least one sampling point includes:
   controlling the point cloud sensor to collect measurement data of the at least one sampling point in a target scene, wherein the measurement data includes at least one of distance or orientation data of the at least one sampling point relative to the point cloud sensor; and
   determining three-dimensional position data of the at least one sampling point in a preset coordinate system according to the measurement data.

4. The method according to claim 3, wherein the preset coordinate system is a geographic coordinate system, or a body coordinate system of the movable platform.

5. The method according to claim 4, wherein the determining of the three-dimensional position data of the at least one sampling point in the preset coordinate system according to the measurement data includes:
   obtaining the first position and attitude data of at least one of the movable platform or the point cloud sensor in the geographic coordinate system during the collecting of the at least one sampling point; and
   determining the three-dimensional position data of the at least one sampling point in the geographic coordinate system according to the measurement data and the first position and attitude data in the geographic coordinate system.

6. The method according to claim 1, wherein the point cloud picture includes projection of the at least one sampling point.

7. The method according to claim 1, further comprising:
   obtaining, by the control apparatus, color information of the at least one sampling point projected on the observation plane, wherein
   the generating of the point cloud picture according to the at least one sampling point projected onto the observation plane includes:
   generating the point cloud picture according to the color information of the at least one sampling point projected on the observation plane.

8. The method according to claim 7, wherein
   the movable platform further carries a visible light sensor; and
   the color information of the at least one sampling point is determined based on a visible light image formed by collecting the target scene by the visible light sensor.

9. The method according to claim 8, further comprising:
   determining, by the control apparatus, at least one pixel point corresponding to a same object point as the at least one sampling point in the visible light image; and
   determining, by the control apparatus, the color information of the at least one sampling point according to a pixel value of the at least one pixel point.

10. The method according to claim 8, wherein the visible light sensor is fixedly connected with the point cloud sensor.

11. The method according to claim 10, wherein the visible light sensor is fixedly connected with the point cloud sensor and carried on the movable platform via a gimbal structure.

12. The method according to claim 1, further comprising:
in response to a marking operation on the user apparatus, obtaining, by the control apparatus, position information and content information of a mark on the point cloud picture;
determining, by the control apparatus, a target sampling point corresponding to the position information of the mark in a three-dimensional model of a target scene according to the position information of the mark; and
storing, by the control apparatus, the content information in association with the target sampling point.

13. The method according to claim 12, wherein the content information includes at least one of task information, type information, or status information.

14. The method according to claim 12, wherein the target sampling point is one or more sampling points in the three-dimensional model.

15. The method according to claim 12, wherein the determining of the target sampling point corresponding to the position information of the mark includes:
determining one or more target sampling points corresponding to the position information of the mark in the three-dimensional model according to the position information of the mark and a projection relationship of a currently displayed point cloud picture.

16. The method according to claim 15, wherein
the position information of the mark includes a two-dimensional coordinate position of a point of the marking operation on the observation plane; and
the determining of the one or more target sampling points corresponding to the position information of the mark in the three-dimensional model includes:
starting from the two-dimensional coordinate position on the observation plane, determining a sampling point closest to the observation plane in the three-dimensional model along a preset direction of the observation plane as the one ore more target sampling point.

17. The method according to claim 1, further comprising:
in response to a marking operation on the user apparatus, obtaining, by the control apparatus, position information of a mark on the point cloud picture;
determining, by the control apparatus, spatial position information corresponding to the position information of the mark according to the position information of the mark; and
controlling, by the control apparatus, the point cloud sensor to collect three-dimensional data of a sampling point corresponding to the spatial position information.

18. The method according to claim 1, further comprising:
in response to a marking operation on the user apparatus, obtaining, by the control apparatus, position information of a mark on the point cloud picture;
determining, by the control apparatus, a plurality of target sampling points corresponding to the position information of the mark in a three-dimensional model of a target scene according to the position information of the mark; and
identifying, by the control apparatus, a target object corresponding to the plurality of target sampling points in the three-dimensional model according to the plurality of target sampling points.

19. The method according to claim 18, further comprising:
controlling, by the control apparatus, the movable platform to track the target object identified.

20. The method according to claim 1, further comprising:
in response to a framing operation on the user apparatus, obtaining, by the control apparatus, position information of a mark on the point cloud picture;
determining, by the control apparatus, a target sampling point corresponding to the position information of the mark in a three-dimensional model of a target scene according to the position information of the mark; and
displaying, by the control apparatus, measurement data of the target sampling point.

* * * * *